Patented Sept. 16, 1930

1,775,882

UNITED STATES PATENT OFFICE

CHARLES O. YOUNG AND STUART D. DOUGLAS, OF CHARLESTON, WEST VIRGINIA, ASSIGNORS TO CARBIDE & CARBON CHEMICALS CORPORATION, A CORPORATION OF NEW YORK

METHOD OF POLYMERIZING VINYL COMPOUNDS

No Drawing.   Application filed December 27, 1928. Serial No. 328,846.

As is well known, useful products can be obtained by polymerizing various chemical compounds, for example aldehydes, phenols, urea, hydrocarbons, and their derivatives. In particular it has been proposed to polymerize vinyl compounds, for example, vinyl chloride, vinyl acetate and styrol, to produce resinous bodies adapted for use as plastics, as adhesives, as ingredients of liquid coating compositions, and for other purposes.

To bring about polymerization, it has been proposed to heat the unsaturated compound, or to expose it to sunlight or other form of actinic light, or to treat it with a catalyst, or to use a combination of these measures. Several substances have been used as catalysts but powerful oxidizing agents like hydrogen peroxide and benzoyl peroxide have met with the greatest favor where vinyl compounds were involved.

We have found that lead tetraethyl $Pb(C_2H_5)_4$, is an excellent polymerizing and condensing catalyst, especially in the polymerization of vinyl chloride, vinyl acetate, and mixtures of these compounds. The polymers formed in the presence of tetraethyl lead are found to be less affected by heat and exposure, and hence are more useful than resins made by other methods.

Films containing vinyl resins prepared by prior methods, have been found to exhibit an objectionable tendency to disintegrate upon prolonged exposure, and to darken when heated. These tendencies are especially pronounced when the films are in contact with metal, and it has been assumed that corrosion of the underlying metal by acid developed in the resin is in some measure responsible for the deterioration of the film. Films containing resins prepared with tetraethyl lead are more stable in contact with metals. To explain this greater stability we offer the theory that films prepared with tetraethyl lead, an oxygen-free compound, contain less acid, and have less tendency to produce acid than the resins heretofore prepared with oxidizing catalysts. It is possible, however, that polymers prepared by our process differ from prior resins in their molecular structure and it is to be understood that the invention is not to be restricted by any theory advanced.

The following examples will serve to illustrate the invention:

Example I 1750 parts of vinyl chloride, 1750 parts of vinyl acetate and 70 parts of lead ethyl are added to 1500 parts of acetone in a pressure autoclave, preferably made of steel and lined with tin or lead and heated at 100° C. for 24 hours. A tacky, white viscous resin solution is formed.

Example II 70 parts of vinyl chloride and 1.4 parts of lead ethyl are added to 30 parts of acetone and heated for 20 hours in a suitable autoclave at 80° C. A white, viscous gelatinous resin solution is formed.

Example III 105 parts of vinyl acetate and 2 parts of lead ethyl are added to 45 parts of acetone and heated for 24 hours in a suitable autoclave. A viscous, glassy resin solution is produced.

Lead tetraethyl can be used in conjunction with other catalysts, and actinic light or other accelerating influence can of course be applied.

We claim:—

1. A method which comprises polymerizing vinyl compounds in the presence of lead tetraethyl.

2. A method of polymerizing vinyl compounds which comprises mixing the compound to be polymerized with lead tetraethyl, and heating the mixture.

In testimony whereof, we affix our signatures.

CHARLES O. YOUNG.
STUART D. DOUGLAS.